Nov. 8, 1966 M. L. MORTON, JR 3,283,797
TIRE TRACTION DEVICE
Filed March 25, 1965 3 Sheets-Sheet 1
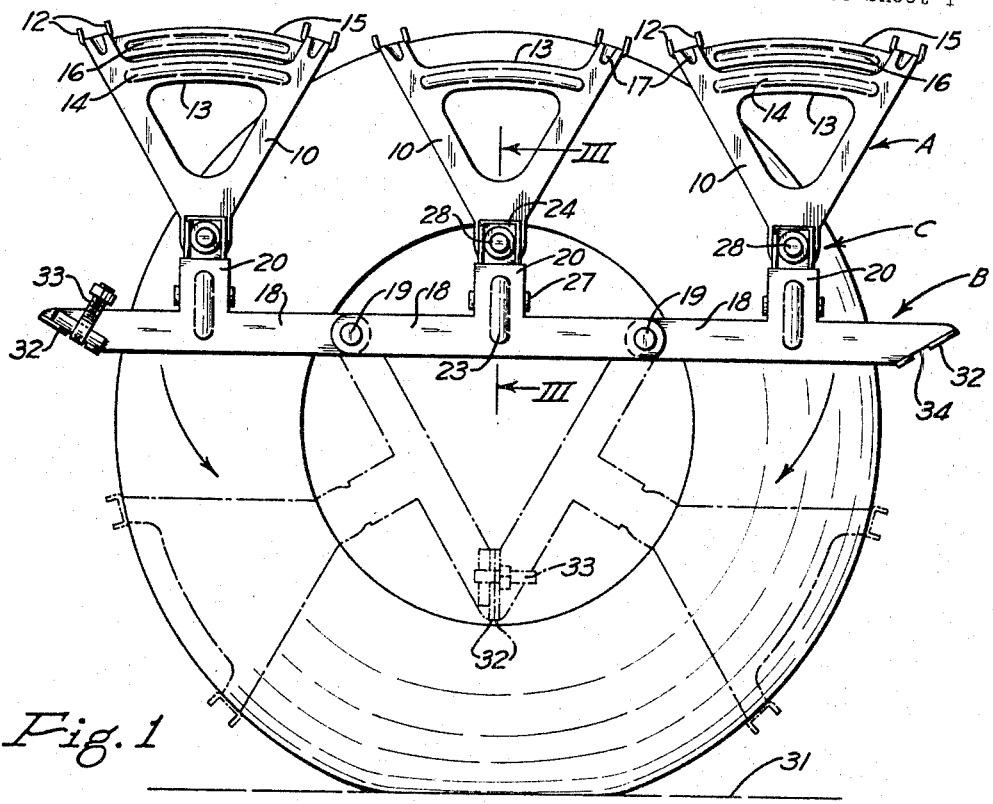
Fig. 1
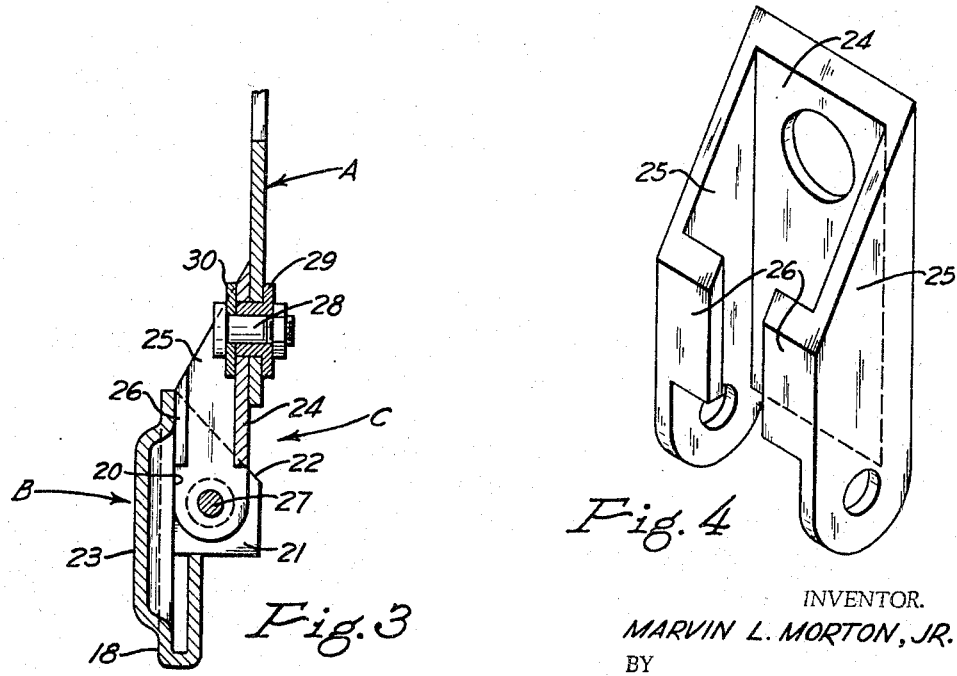
Fig. 3
Fig. 4
INVENTOR.
MARVIN L. MORTON, JR.
BY
Brown, Critchlow, Flick & Peckham
ATTORNEYS.

Nov. 8, 1966  M. L. MORTON, JR  3,283,797
TIRE TRACTION DEVICE
Filed March 25, 1965  3 Sheets-Sheet 3
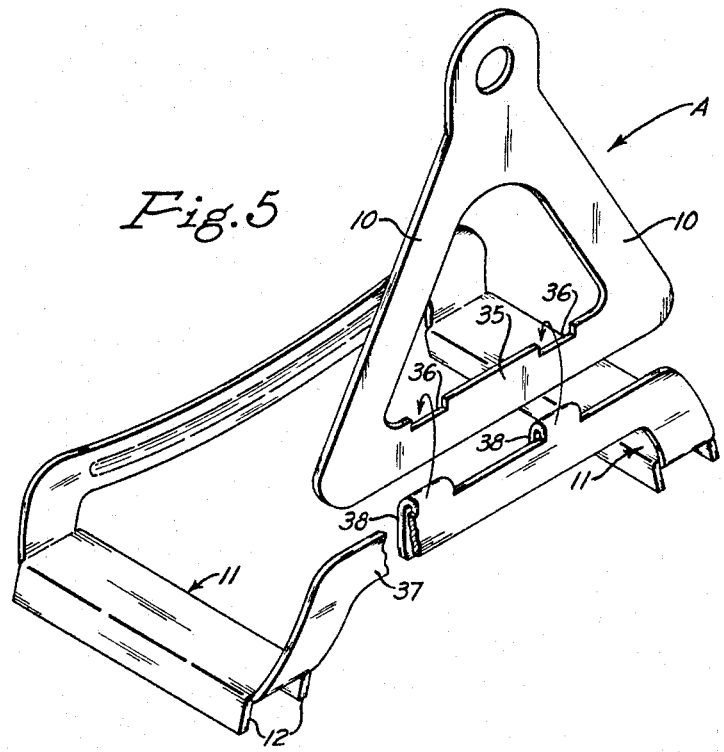
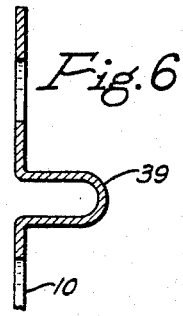
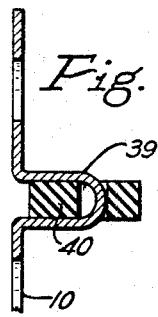
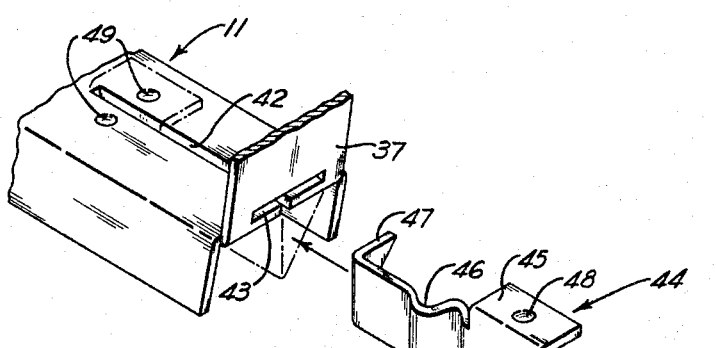
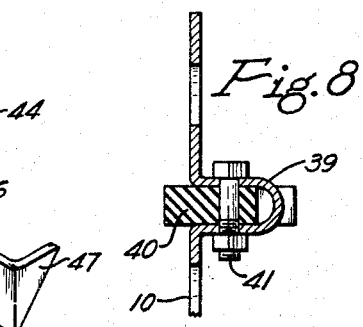
INVENTOR.
MARVIN L. MORTON, JR.
BY
Brown, Critchlow, Flick & Peckham
ATTORNEYS.

United States Patent Office 3,283,797
Patented Nov. 8, 1966

3,283,797
TIRE TRACTION DEVICE
Marvin L. Morton, Jr., 1205 Mill St., Pittsburgh, Pa.
Filed Mar. 25, 1965, Ser. No. 442,753
10 Claims. (Cl. 152—228)

This invention relates to a device providing traction for the wheels of a motor vehicle when it is desired to operate on roads made slippery by snow or ice.

The invention aims to provide a traction device that can be easily and quickly applied to a tire without jacking it off the ground. The device can be conveniently applied without special tools and is simple and inexpensive to manufacture.

The traction device includes traction claws that are mounted on a hinged mounting member by means of wrist-joint members that permit universal wrist action of the claws in two directions.

The invention also provides replaceable elements for the parts of the traction claws that contact the road surface and are therefore most subject to wear.

These and other objects and advantages of the invention will become evident as the description proceeds.

In the drawings:

FIG. 1 is a front elevation illustrating diagrammatically the device and its application to a tire.

FIG. 3 is an enlarged section on line III—III of FIG. 1.

FIG. 4 is an enlarged isometric view of the body of the wrist-joint member.

FIG. 5 is an enlarged exploded isometric view showing a modified traction claw.

Figure 2:
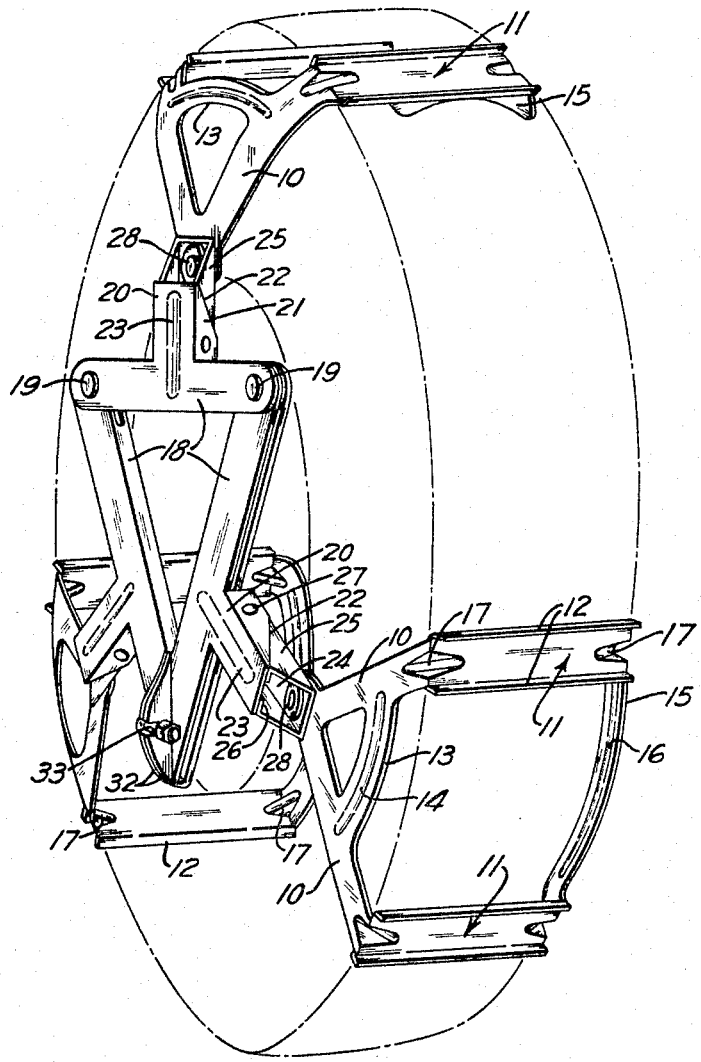
FIG. 2 is an isometric view of the device applied to a tire.

FIGS. 6, 7, and 8 are fragmentary sectional views showing modifications of the arms of the traction claw.

FIG. 9 is an exploded isometric view showing a modified structure for the traction bars.

General arrangement

Referring to FIG. 1 in general, the traction device includes three traction claws A carried on a hinged mounting member B. The claws A are attached to the mounting member B by means of wrist-joint members C.

The solid lines of FIG. 1 illustrate the preliminary position in applying the device to a tire. In this position the middle traction claw A is hooked over the tire. The hinged mounting member B is then moved to the final mounted position shown in dot-dash lines in FIG. 1. In this final position all of the traction claws A are hooked over the tire, and the free ends of the mounting member B are fastened together by any suitable fastening means.

Further details of the device will now be explained.

Traction claws A

Each of the traction claws A is preferably stamped from a single piece of sheet metal, and includes the radially extending arms 10, each of which carries at its outer end a traction bar 11. (See FIG. 2.) The traction bars 11 extend across the tread of the tire when the traction device is clamped in operative position.

In order to reinforce the traction bars 11 and to provide simple and efficient traction projections, the side edges of each bar 11 are bent outwardly to form the projecting gripping edges 12.

An arcuate reinforcing strut 13 provided with a pressed-out rib 14, joins together the radial arms 10 near their extremities, and an arcuate reinforcing strut 15, provided with a pressed-out rib 16, joins together the free ends of the traction bars 11 and extends down along the inner side of the tire to assist in holding the traction claw in place.

The bend where each traction bar 11 is attached to the radial arm 10 is reinforced by a pressed-in angular rib 17. A similar rib 17 reinforces the bend between the traction bar 11 and the inside arcuate strut 15.

Hinged mounting member

The hinged mounting member B includes three locking links 18 hinged together at pivots 19. Each of these links 18 is of the same size and construction except that the free ends of the two end links carry suitable means for locking these free ends together when the device is in the mounted position.

As will be clear from FIGS. 2 and 3, each locking link 18 is formed from a piece of sheet metal bent to a U-shaped cross-section with the open face of the U facing away from the wheel axis.

At the middle of each locking link 18 the outer part of the U-shaped member is extended to form an attaching arm 20 on which the traction claw A is mounted. This gives each of the locking links the general outline of an inverted T. The attaching arm 20 is also bent into a U-shaped cross-section to form side plates 21 which are tapered inwardly toward the link 18, as shown at 22 in FIGS. 2 and 3.

The attaching arm 20 is reinforced by a pressed-out rib 23 which extends lengthwise of the attaching arm and crosses into the main body of the locking link 18.

At the pivoted ends of the locking links 18 the different layers of metal are interleaved as clearly shown in FIG. 2, and the pivot 19 is formed by the insertion of a suitable stout pivot member such as a strong rivet with heavy heads. This will produce a strong pivot joint that can resist torsional loads along the axis of the locking links 18.

Wrist-joint members C

The traction claws A are attached to the outer ends of the attaching arms 20 by means of the wrist-joint members C, which will now be explained, with particular reference to FIGS. 2, 3, and 4.

The body of the wrist-joint member is formed by bending a piece of sheet metal up into a box-like part shown in detail in FIG. 4, with a bottom wall 24 and side walls 25. The upper edges of side walls 25 are bent over toward each other to form flat ledges 26 that bottom against the outer wall of the attaching arm 20 in a certain position.

The wrist-joint member C is pivotally attached to the attaching arm 20 by a pivot pin 27 at a point close to where the attaching arm joins the locking link 18. The pivot pin 27 passes through the side plates 21 of the attaching arm and through the side walls 25 of the wrist pin member C. The pivot pin 27 is disposed at a right angle to the wheel axis.

A traction claw A is pivotally attached to the wrist-joint member C by a pivot pin 28 which passes through the outer end of the bottom wall 24 of the wrist-joint member and through the inner end of the traction claw. The pivot pin 28 is disposed parallel to the wheel axis.

A flanged bushing 29 and washer 30 form bearing members for the joint at the pivot pin 28.

The arrangement of the pivot pins 27 and 28 is given in relation to the axis of the wheel on which the tire traction device is mounted, since that is the simplest way to describe the direction of the axes of these pivot pins.

It should be clear from the above description that the wrist-joint member C and its related pivots permit pivotal motion of the traction claw A in two directions as follows:

(1) The traction claw A swings about pivot 28 in an arcuate path the axis of which is parallel to the axis of the arc of rotation of the tire.

(2) The traction claw A swings about pivot 27, inwardly toward the tire, as before mentioned about an axis perpendicular to that of the tire. Outward movement of the claw A away from the tire is limited by engagement of the flat ledges 26 with the outer wall of the attaching arm 20.

Method of mounting

FIG. 1 shows the tire resting on a road surface 31. Without jacking up the wheel, the traction device is applied to the outside of the tire in the position illustrated in the solid lines in FIG. 1. In this position the central traction claw A is hooked over the tire and the hinged mounting member B extends in a straight line.

The outer parts of the hinged mounting member B are now hinged downwardly to the position illustrated by the dot-dash lines of FIG. 1. During this movement the two outer traction claws A become hooked over the tire.

The two free ends of the hinged mounting member B are now fastened together to secure the traction device in place. This fastening may be done in any preferred manner.

In the form illustrated a locking lip 32 extends outward from the plane of the tire at the free end of each of the outer locking links 18. A captive locking bolt 33 is pivotally mounted inside one of the lips 32, and after the lips have been brought together the bolt 33 is swung around and into a slot 34 formed in the other lip. The nut on bolt 33 is then drawn up to press the two lips together, thus clamping the traction device in place on the tire.

Operation

It will be understood from the above description that the present invention provides a traction device that can be easily applied to a tire without jacking up the wheel or moving the car.

The fact that the traction claws A can move on pivot 28 in the circumferential direction about the tire makes it easy to adjust the device to the tire, and permits the necessary pivotal movement of the traction claw as it engages and leaves the road surface.

The fact that the traction claws A can pivot inwardly about the pivot 27 also facilitates adjustment of the device on the tire and permits movement of the traction claw to adjust to road irregularities.

In the preferred form the parts of the traction device are formed from sheet steel with some natural resilience. This resilience of the parts will help in permitting the device to yield to road irregularities.

Variants

In FIG. 5 the traction claw A includes the radial arms 10 connected by a cross member 35 which is formed with attaching slots 36. The outer part of the traction claw is a separate detachable member which includes a side plate 37, which has downwardly extending ends which carry the traction bars 11.

In the form illustrated the side plate 37 carries clips 38 which extend downwardly and engage the attaching slots 36 to couple the two parts of the traction claws together, but any suitable method of attachment may be used.

If it is desired to increase the compliance of the device to road irregularities, this can be done by introducing a limited additional amount of flexibility into the traction claws A. One construction for doing this is illustrated in FIG. 6.

In this figure each of the radial arms 10 of the traction claw is formed with an outwardly extending U-shaped bend 39. Since the traction claw is formed from resilient metal, this U-shaped bend will act as a spring which will introduce some additional flexibility into the radial arms 10 of the traction claw and act as a preloading means to increase the grip of the device on the tire.

In case it is desired to limit the amount of compliance introduced by the U-shaped bend 39, a block 40 of resilient material, such as rubber, can be inserted inside the U-shaped bend 39. This can conveniently be done by forming the block of rubber with a slot which is threaded over the upper end of the traction claw A and forced into place in the U-shaped bend 39, as shown in FIG. 7.

In case it is desired to place a definite limit on the amount of radial yielding of the U-shaped bend 39, a bolt 41 or other similar restraining means may be inserted through the bight of the U-shaped bend, as illustrated in FIG. 8.

A variant which provides a replaceable traction bar is illustrated in FIG. 9. As illustrated in this figure the bottom wall of the traction bar is formed with a slot 42 which extends from near the middle of the traction bar to one end. The side plate 37 is formed with a T-shaped slot 43 which communicates with the slot 42.

The replaceable traction bar 44 is formed with a bent-over tab 45 which is adapted to have a slideable fit within the combined slots 42 and 43. The body of replaceable traction bar 44 consists of a piece of sheet-like metal formed with several bends 46 which serve as lateral support surfaces and with bent-over ends 47 which also help to support the replaceable bar in vertical position when it is in place within the channel of the traction bar 11.

The replaceable traction bar is held in place by any suitable means, such as a dimple 48 formed on tab 45, which engages in a corresponding depression 49 formed in the bottom of the traction bar 11.

It will be understood that the replaceable traction bar 44 may be inserted in the channel of the traction bar 11 with the bent-over tab 45 extending toward either side. It is therefore not necessary to use any exceptional care in inserting the replaceable bar 44 in the channel-shaped traction bar 11.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a traction device for mounting on a pneumatic tire of a vehicle wheel while the tire remains in contact with the ground, the improvement which comprises:
 a mounting member consisting of only three locking links of equal length hinged together and provided with means for clamping the free ends of the two outer links together to form an equilateral triangle;
 the mounting member being adapted to be placed on the outside only of the wheel,
 a wrist member mounted in the middle of each locking link, and
 a traction claw attached to each wrist member, the traction claws being adapted to be clamped over the periphery of the tire.

2. A device as claimed in claim 1 in which each wrist member is provided with two free pivots, one pivot having an axis parallel to the axis of the vehicle wheel, and the other pivot disposed at a right angle to the axis of the vehicle wheel, the parts being so arranged as to permit some movement about both of said pivots when the traction device is in operating position.

3. A device as claimed in claim 1 in which each traction claw carries a replaceable portion which carries traction bars adapted to extend across the tire tread.

4. A device as claimed in claim 1 in which:
 each traction claw has a pair of radial arms arranged in a V-shape;
 a traction bar attached to the outer end of each radial arm and adapted to extend across the tire tread; and a reinforcing strut connecting the inner ends of the traction bars.

5. A device as claimed in claim 4 in which each radial arm of the traction claws is formed with an outward U-shaped bend to increase the compliance of the traction claw and preload the grip of the device upon the tire.

6. A device as claimed in claim 4 in which each radial arm of the traction claws is formed with an outward U-shaped bend and a piece of resilient material is secured inside the U-shaped bend.

7. In a traction device for mounting on a pneumatic tire of a vehicle while the tire remains in contact with the ground, the improvement which comprises:
   a mounting member consisting of a central locking link, two outer locking links hinged to opposite ends of the central locking link, and means for fastening together the free ends of the outer locking links;
   a wrist member mounted on each of the locking links, each wrist member being provided with two free pivots, one pivot having an axis parallel to the axis of the vehicle wheel, and the other pivot disposed at a right angle to the axis of the vehicle wheel;
   a traction claw attached to each wrist member, each traction claw being adapted to be clamped over the periphery of the tire.

8. A device as claimed in claim 7 in which:
   each traction claw carries a pair of traction bars adapted to extend across the tire tread; and
   a reinforcing strut connecting the inner ends of the traction bars.

9. In a traction device for mounting on a pneumatic tire of a vehicle wheel, the improvement which comprises:
   a plurality of traction claws;
   each traction claw including a channel-shaped traction bar having a flat bottom and projecting gripping edges; and
   a replaceable traction bar slideably mounted in each channel-shaped traction bar.

10. A device as claimed in claim 9 in which:
    each traction bar is carried by side plates which are connected at each end of the flat bottom of the channel-shaped traction bar;
    the flat bottom of each channel-shaped traction bar being formed with a slot, and one of the side plates for each channel-shaped traction bar being formed with a T-shaped slot in communication with the slot in the flat bottom;
    a replaceable traction bar slideably mounted in each channel-shaped traction bar and having a bent-over tab which passes through the T-shaped slot and engages in the slot in the flat bottom of the channel-shaped traction bar; and
    means to hold the replaceable traction bar in place.

References Cited by the Examiner

UNITED STATES PATENTS

| | | | |
|---|---|---|---|
| 1,283,729 | 11/1918 | Ginley | 152—228 X |
| 1,769,307 | 7/1930 | Price | 152—225 |
| 2,274,180 | 2/1942 | Zahradnik | 152—216 X |
| 2,596,096 | 5/1952 | Brandvold | 152—218 |

ARTHUR L. LA POINT, *Primary Examiner.*

C. W. HAEFELE, *Assistant Examiner.*